United States Patent [19]

Takahashi

[11] Patent Number: 5,017,848
[45] Date of Patent: May 21, 1991

[54] DRIVE CONTROL CIRCUIT
[75] Inventor: Atsuhiko Takahashi, Morioka, Japan
[73] Assignee: Alps Electric Co., Ltd., Tokyo, Japan
[21] Appl. No.: 541,233
[22] Filed: Jun. 20, 1990
[30] Foreign Application Priority Data
 Jul. 10, 1989 [JP] Japan .................. 1-177777
[51] Int. Cl.⁵ .......................... H03M 13/00
[52] U.S. Cl. .................. 318/568.1; 318/630; 371/21.2; 371/25.1; 371/29.1; 380/28
[58] Field of Search .................. 318/560–640; 371/2.1, 3, 5.1, 10.1, 14, 15.1, 19, 21.1, 40.1, 40.2; 380/4, 28, 46, 48

[56] References Cited
U.S. PATENT DOCUMENTS

| | | | |
|---|---|---|---|
| 3,544,777 | 12/1970 | Winkler | 371/21.2 X |
| 4,698,617 | 10/1987 | Bauer | 380/28 |
| 4,829,520 | 5/1989 | Toth | 371/26 X |
| 4,862,371 | 8/1989 | Maekawa | 371/29.1 X |
| 4,953,165 | 8/1990 | Jackson | 371/25.1 X |

FOREIGN PATENT DOCUMENTS 63-191665A 8/1988 Japan .

Primary Examiner—Paul Ip
Attorney, Agent, or Firm—Guy W. Shoup

[57] ABSTRACT

The present invention relates to a drive control circuit for controlling a driving system including, e.g., a carriage driving motor, a print head and others, which is to be employed in an apparatus such as a printer. More specifically, the present invention is concerned with a drive control circuit which can protect the driving system properly and prevent the driving system from being damaged, when a malfunction occurs in a ROM as in the case where the ROM in which a control program for controlling the driving system and a runaway detection program for the prevention of burning or the like which occurs in a driving motor as a result of the runaway of the control program have been written therein, is damaged or as in the case where no ROM is incorporated.

1 Claim, 1 Drawing Sheet

DRIVE CONTROL CIRCUIT

BACKGROUND OF THE INVENTION (1.) Field of the Invention:

The present invention relates to a drive control circuit, and particularly to a drive control circuit for controlling a driving system including a carriage driving motor, a print head and others, which is to be incorporated in an apparatus such as a printer.

(2.) Description of the Prior Art:

In general, drive control circuits for controlling driving systems each including a carriage driving motor, a print head, etc. have been incorporated into apparatus such as printers.

FIG. 2 is a block diagram showing one of such conventional drive control circuits as described above. In the drawing, a ROM 2 is connected to a CPU 1 which performs predetermined control. In addition, a driving system 3 including a carriage driving motor, a print head, etc. is connected to the CPU 1.

Further, a control program for controlling the driving system 3 and a runaway detection program for the prevention of burning or the like which occurs in the driving motor as a result of the runaway of the control program have been written in the ROM 2.

In each of the conventional drive control circuits, when the CPU 1 is first activated, the control program which has been written in the ROM 2 is read and executed by the CPU 1, so that a desired drive control of the driving system 3 is performed.

In addition, when the control program is run out of control owing to some reasons, the runaway detection program in the ROM 2 is executed so as to reset the CPU 1, thereby preventing failure in the driving system 3.

However, in the above-described conventional drive control circuit, when the ROM 2 is in a normal operation, no problem take place. On the other hand, when a malfunction occurs in the ROM 2, as in the case where no ROM 2 is incorporated in the circuit or in the case where the ROM 2 is damaged, the CPU 1 fails to read the control program and the runaway detection program which have already been written in the ROM 2 and hence the runaway detection program cannot be executed properly, thereby failing to perform proper control of the driving system 3, and the driving system 3 still remains energized. As a consequence, the conventional drive control circuit is accompanied by a problem that damage to the driving system 3 caused by burning or the like takes place. Heretofore, a drive control circuit having a protection/control function with respect to the malfunction of the ROM 2 as described above has not been proposed.

SUMMARY OF THE INVENTION

With the foregoing problem in view, it is therefore an object of this invention to provide a drive control circuit which can protect a driving system appropriately when a malfunction occurs in a ROM as in the case where the ROM itself is damaged or in the case where no ROM is incorporated therein.

According to a first aspect of this invention, there is provided a drive control circuit of a type wherein at least one ROM, in which a control program for controlling the driving system and a runaway detection program for the prevention of a malfunction which occurs in the driving system as a result of the runaway of the control program have been written therein, is connected to a CPU which performs predetermined control of the driving system and when the control program is run out of control, the runaway detection program is executed so as to reset the CPU, thereby protecting the driving system, the circuit comprising:

protection means provided between the CPU and the driving system and for connecting the CPU to the driving system or disconnecting the CPU therefrom; and ROM malfunction detecting means for detecting whether or not the ROM is in a normal operation state and for supplying a disconnection actuating signal to the protection means upon malfunction of the ROM.

According to the drive control circuit of this invention, when the CPU is first activated, the control program which has been written in the ROM is read and executed by the CPU, so that a desired drive control of the driving system is performed. When the control program is run out of control owing to some reasons, the runaway detection program which has been written in the ROM is executed so as to reset the CPU, whereby damage to the driving system can be prevented. In addition, when an undesirable malfunction occurs in the ROM, the ROM malfunction detecting means serves to supply a disconnection actuating signal to the protection means for disconnecting the CPU from the driving system, thereby making it possible to avoid the supply of an improper control signal to the driving system. As a result, the damage to the driving system is prevented.

According to the drive control circuit of this invention, as has been described above, when some malfunctions occur in the ROM, the ROM malfunction detecting means serves to cut off the electrical connection between the CPU and driving system. As a consequence, the drive control circuit shows effects in making it possible to protect the driving system appropriately upon malfunction of the ROM and to assuredly prevent the occurrence of burning or the like in the driving motor of the driving system.

The above and other objects, features and advantages of the present invention will become apparent from the following description and the appended claims, taken in conjunction with the accompanying drawings in which a preferred embodiment of the present invention is shown by way of illustrated example.

DETAILED DESCRIPTION OF THE PREFERRED EMBODIMENTS

Figure 1:
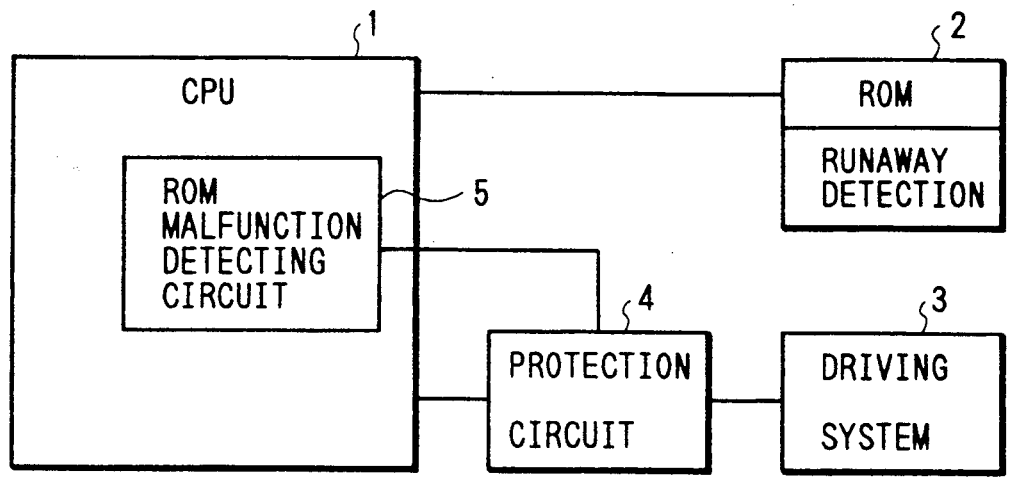
FIG. 1 is a block diagram of a drive control circuit according to one embodiment of this invention.

A preferred embodiment of this invention will hereinafter be described with reference to FIG. 1. In the same drawing, the same elements of structure as those shown in FIG. 2 are identified by like reference numerals.

Figure 2:
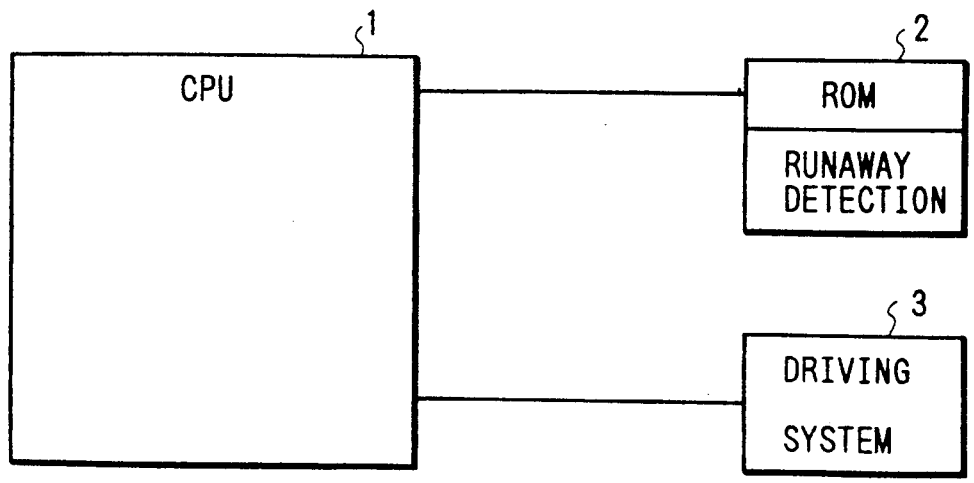
FIG. 2 is a block diagram of a conventional drive control circuit.

FIG. 1 is a block diagram showing one embodiment of a drive control circuit according to this invention. A ROM 2 is connected to a CPU 1 which performs predetermined control. In addition, a driving system 3 including a carriage driving motor, a print head, etc. is connected to the CPU 1.

Further, a control program for controlling the driving system 3 and a runaway detection program for preventing burning or the like which occurs in the driving motor as a result of the runaway of the control program have been written in the ROM 2.

In the present embodiment, a protection circuit 4 such as a relay for connecting the CPU 1 to the driving system 3 or disconnecting the CPU 1 from the driving system 3 is interposed between the CPU 1 and the driving system 3. Incorporated into the CPU 1 is a ROM malfunction detecting circuit 5, which in turn judges whether or not the ROM 2 is normally operated. When the ROM 2 is normally in operation, the ROM malfunction detecting circuit 5 supplies a connection actuating signal to the protection circuit 4, and when the ROM 2 is in an improper operation state, it delivers a disconnection actuating signal to the protection circuit 4.

A description will next be made on the operation of the present embodiment.

In the present embodiment, when the CPU 1 is first activated, the ROM malfunction detecting circuit 5 is caused to operate. Where the ROM 2 is normally in operation, as in the case where the ROM 2 is incorporated in an appropriate state or in the case where a control program written in the ROM 2 can be read therefrom, the ROM malfunction detection circuit 5 serves to output a connection actuating signal to the protection circuit 4, thereby connecting the CPU 1 to the driving system 5. Then, the CPU 1 reads and executes the control program which has been written in the ROM 2 for performing a desired drive control of the driving system 3.

When the control program is run out of control owing to some reasons, the runaway detection program in the ROM 2 is executed so as to reset the CPU 1, thereby preventing failure in the driving system 3.

For example, where a malfunction occurs in the ROM 2, as, for example, in the case where the ROM 2 is brought into a damaged state or in the case where no ROM is incorporated, the ROM malfunction detecting circuit 5 supplies a disconnection actuating signal to the protection circuit 4 for disconnecting the CPU 1 from the driving system 3, thereby to avoid the supply of an improper control signal to the driving system 3. It is thus possible to prevent failure in the driving system 3.

Accordingly, in the present embodiment, when a malfunction occurs in the ROM 2, the ROM malfunction detecting circuit 5 can protect the driving system 3 properly, whereby the occurrence of burning or the like in the driving motor of the driving system 3 can be prevented assuredly.

Incidentally, the present invention is not necessarily limited to the above-described embodiment. It will be apparent to those skilled in the art that many changes and modifications can be made as needed.

What is claimed is:

1. A drive control circuit of a type wherein at least one ROM in which a control program for controlling a driving system and a runaway detection program for the prevention of a malfunction which occurs in said driving system as a result of the runaway of said control program have been written therein is connected to a CPU which performs predetermined control of said driving system and when said control program is run out of control, said runaway detection program is executed to reset said CPU, thereby protecting said driving system, said circuit comprising:

protection means provided between said CPU and said driving system and for connecting said CPU to said driving system or disconnecting said CPU therefrom; and ROM malfunction detecting means for detecting whether or not said ROM is in a normal operation state and for supplying a disconnection actuating signal to said protection means upon malfunction of said ROM.

* * * * *